Feb. 20, 1968 C. VAN DER LELY 3,369,353
AGRICULTURAL MACHINES
Filed Aug. 18, 1965 5 Sheets-Sheet 5

INVENTOR.
CORNELIS VAN DER LELY
BY
Mason, Mason & Albright
ATTORNEYS

United States Patent Office 3,369,353
Patented Feb. 20, 1968

3,369,353
AGRICULTURAL MACHINES
Cornelis van der Lely, Zug, Switzerland, assignor to Texas Industries Inc., Willemstad, Curacao, Netherlands Antilles, a limited-liability company of the Netherlands Antilles
Filed Aug. 18, 1965, Ser. No. 480,623
Claims priority, application Netherlands, Sept. 29, 1964, 64—11,285
11 Claims. (Cl. 56—210)

ABSTRACT OF THE DISCLOSURE

A harvester having a pair of mowing and crop gathering members each of which are pivotable for being lifted about a pair of horizontal axes, one of the axes being normal to the operative direction of travel of the harvester and the other axis being parallel to such direction, the lifting means being hydraulic rams having linked controls whereby when the members are lifted they are first pivoted upward about the axis normal to the harvester's direction of travel and then are pivoted together about axes parallel to such direction.

SUMMARY OF THE INVENTION

This invention relates to agricultural machines, such as combine harvesters, of the kind comprising two working members and hydraulically operable adjusting members for said working members.

In accordance with the invention there is provided a machine of the kind set forth comprising first adjusting members which are provided for raising and lowering said working members and second adjusting members which are provided for pivoting said working members relative to each other, wherein a control mechanism is provided for allowing liquid under pressure to flow to said first adjusting members for raising the working members, the construction and arrangement of the control mechanism being such that it allows liquid under pressure to flow to said second adjusting members for pivoting the working members relative to each other only after the working members have been raised to a given height.

BRIEF DESCRIPTION OF THE DRAWINGS

For a better understanding of the invention and to show how the same may be readily carried into effect, reference will now be made, by way of example, to the accompanying drawings, in which.

DESCRIPTION OF THE PREFERRED EMBODIMENT

Figure 1:
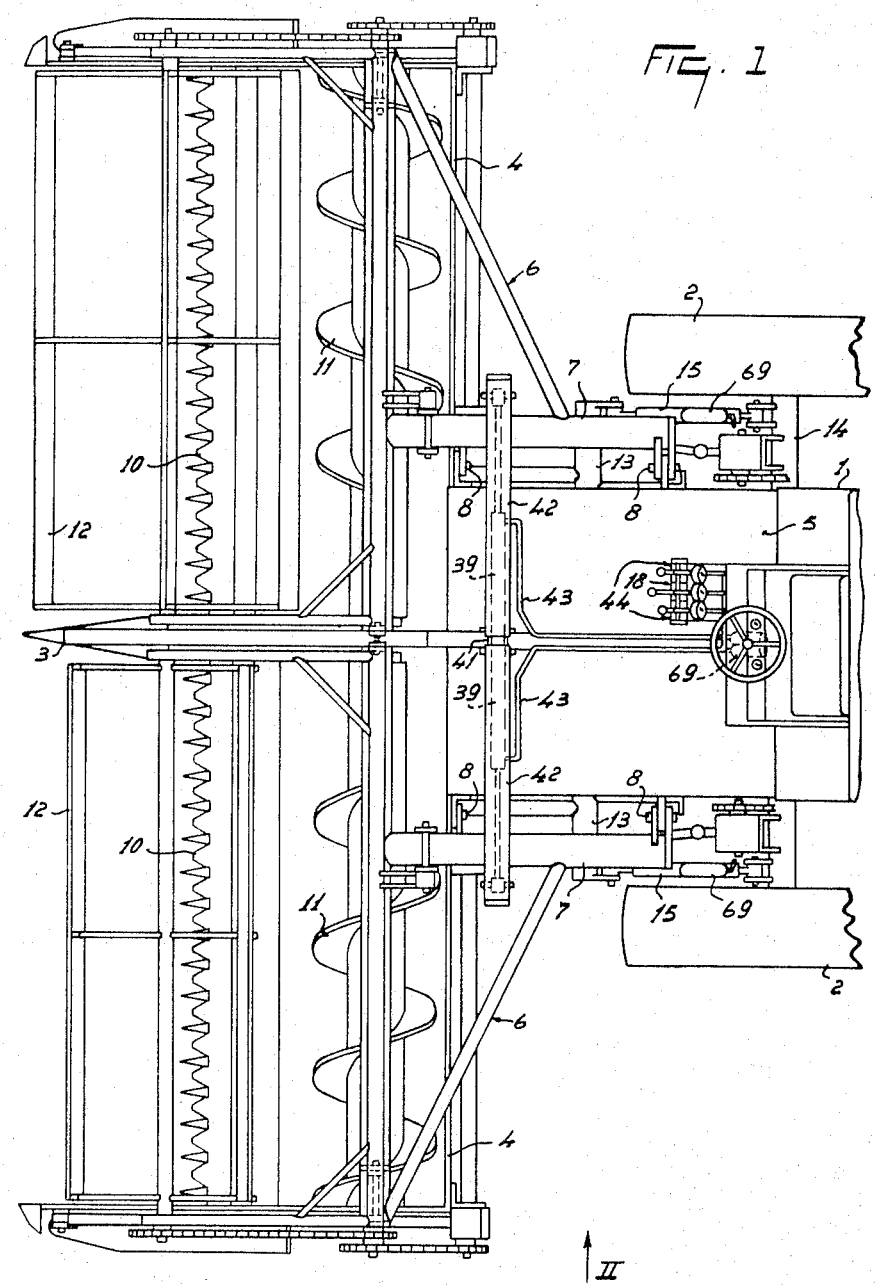
FIGURE 1 is a plan view of the foremost part of a machine in the form of a combine harvester.
Figure 2:
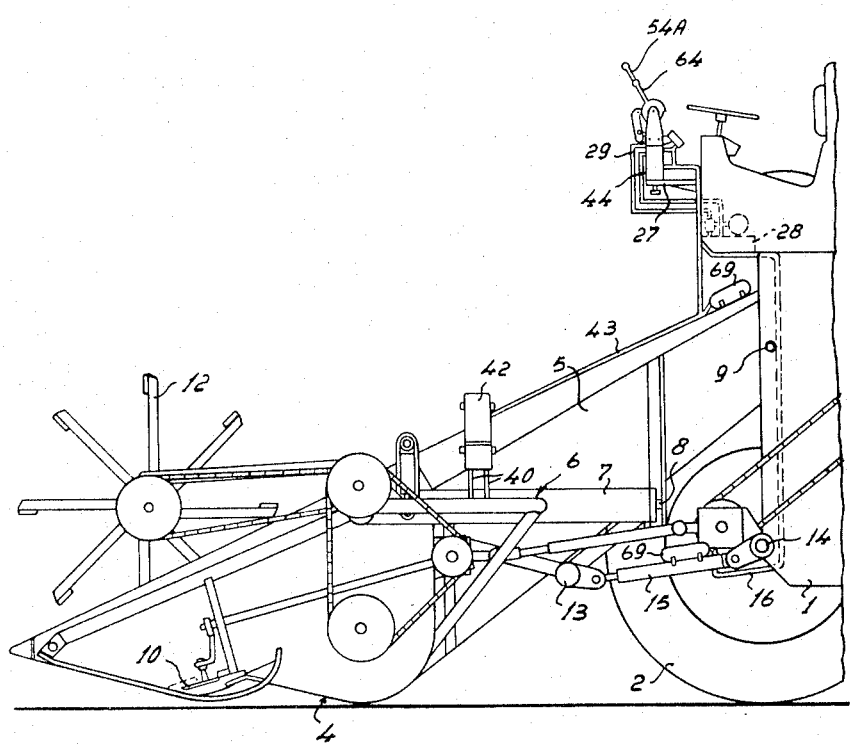
FIGURE 2 is a side view taken in the direction of the arrow II in FIGURE 1.

Referring to the combine harvester shown in FIGURES 1 to 5 and more particularly to FIGURES 1 and 2, there is shown the forward part of a combine harvester which includes a frame 1 supported by front ground wheels 2. The cutting mechanism comprises a mowing table or platform 3 which has two adjacent portions 4. The portions 4 are mounted at the forward end of an elevator housing 5 which is upwardly and downwardly movable about a shaft 9 that extends perpendicular to the intended direction of operative travel of the combine harvester. Each portion 4 has a corresponding supporting frame 6 which comprises a beam 7 extending in said direction of travel and along one side of the elevator housing 5. Each beam 7 is pivotable with respect to the housing 5 on two aligned pivot pins 8 that are secured to said one side of the housing 5. The housing 5 accommodates an endless conveyor which is rotatable about the shaft 9 which also comprises the pivotal axis of the housing 5 and portions 4.

Each portion 4 has a cutter bar 10 and a feed auger 11 located behind said cutter bar 10. Also a reel 12 is arranged above the cutter bar 10. In order to adjust the mowing table 3 and housing 5 about the axis afforded by the shaft 9, a supporting member in the form of an adjusting member or hydraulic ram 15 is provided for each portion 4. The rams 15 are pivotally connected to a supporting beam 13 that is arranged beneath the housing 5 and supports same. The beam 13 extends perpendicular to the intended direction of travel and the other ends of the rams 15 are pivotally connected to the axle 14 of the ground wheels 2.

Figure 3:
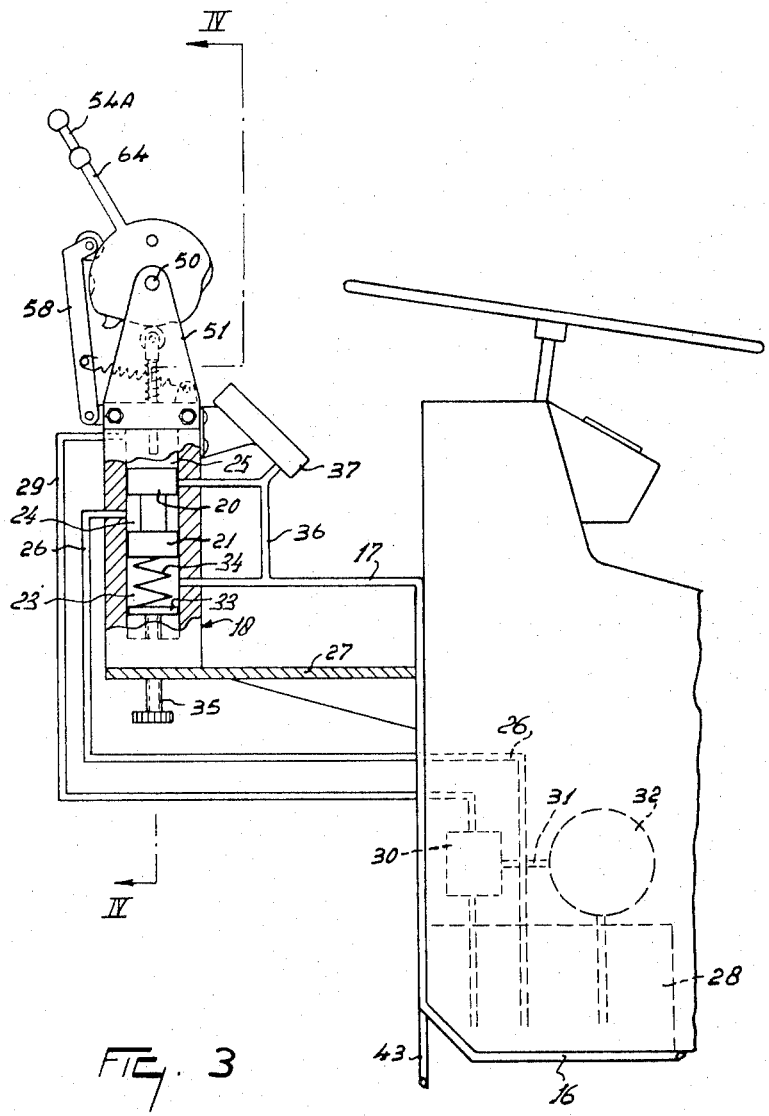
FIGURE 3 is a sectional view of control mechanisms taken on the line III—III in FIGURE 4.
Figure 4:
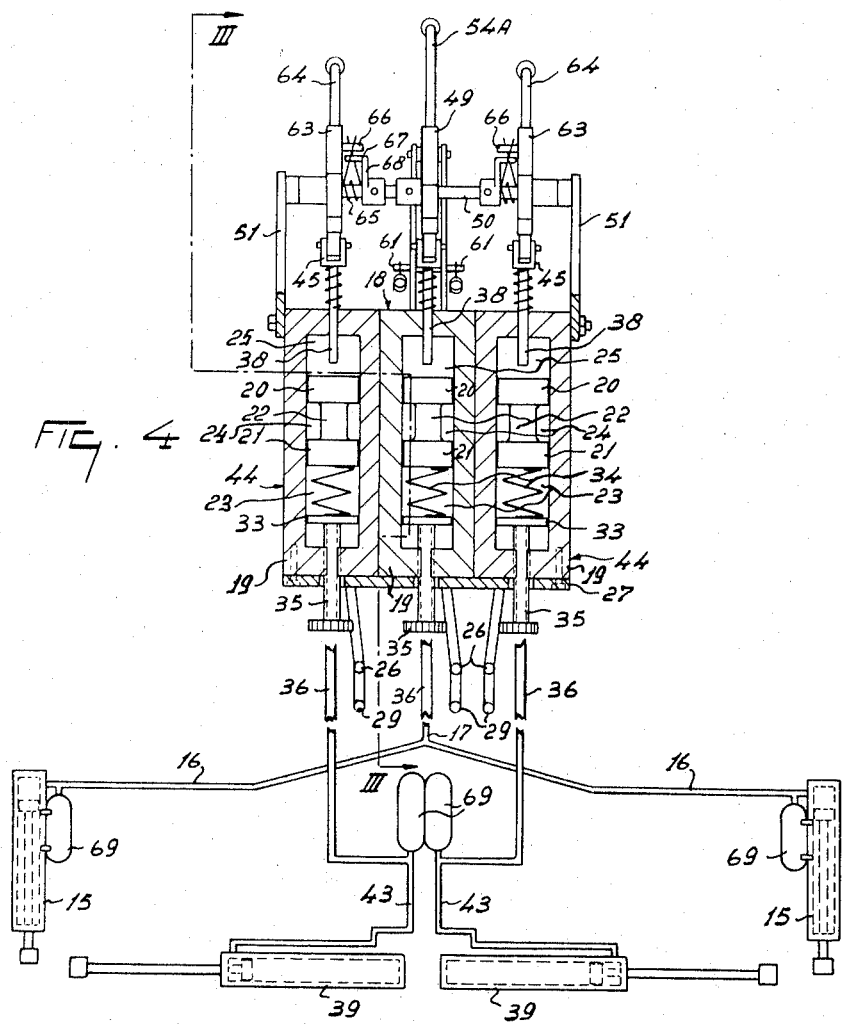
FIGURE 4 is a view, partly in section, taken on the line IV—IV in FIGURE 3, and partly a diagrammatic view, on a reduced scale, showing the hydraulic circuit and the adjusting members forming part of such circuit.

The adjusting cylinders or rams 15 form part of a hydraulic circuit for adjusting the height of the mowing table, said circuit being shown diagrammatically in FIGURES 3 and 4. FIGURE 4 shows three adjacent control mechanisms or valves 18 and 44, the mechanism 18 being located between the mechanisms 44. From FIGURES 3 and 4 it will be seen that each ram 15 communicates by way of a pipe 16 with a common pipe 17 which communicates with the housing 19 of the control mechanism 18. The housing 19 accommodates a pair of spaced pistons 20 and 21 which are slidable in directions parallel to the longitudinal axis of the housing and are interconnected by a connecting member 22. The pair of pistons 20 and 21 divides the bore in which they are slidable into three compartments 23, 24 and 25. The compartment 23 communicates with the pipe 17 (FIGURE 3) from the rams 15 and the compartment 24 communicates through a pipe 26 with a tank 28 of the hydraulic circuit. The compartment 25 communicates with a pump 32 of the hydraulic circuit through a pipe 29, a return valve 30 and pipe 31. A spring 34 is provided in the compartment 23 and extends between the piston 21 and a stop 33 bearing on the upper end of a set bolt 35 screwed through a hole formed in a wall of the housing 19. The mechanisms 44 are similarly constructed to the mechanism 18 and like parts are designated by the same reference numerals.

From FIGURE 3 it will be seen that the common pipe 17 from the rams 15 communicates with a tapping 36 which communicates with pressure gauge 37 provided for measuring the pressure in the rams 15. The wall of the housing 19 opposite to the one provided with the set bolts 35 receives rods 38 which extend into the compartments 25 of the mechanisms 18 and 44. The rods 38 form part of an operating mechanism for the pistons 20 and 21 which will be described later. In order to raise and lower the portions 4 of the mowing table 3 by turning same about the pivotal axes afforded by the pins 8, supporting members or rams 39 are provided which also form part of said hydraulic circuit. As seen in FIGURES 1 and 2, the rams 39 are arranged between arms 40 extending upwardly from the beams 7 and supports 41 provided on the upper side of the housing 3. The rams 39 are arranged co-axial with each other between depending limbs of channel beams 42.

As seen in FIGURE 4, each ram 39 communicates through a pipe 43 with a corresponding control mechanism 44. From FIGURES 1 and 4 it will be evident that the housings 19 of the control mechanisms 18 and 44 are joined to form a single unit which is arranged on a plate 27 mounted near the driver's seat. The housings 19 are so arranged that their longer sides extend substantially vertically and the set bolts 35 that cooperate with the springs 34 are located on the lower side of the unit. The rods 38 carry forks 45 at their upper ends and rollers 47 (FIGURE 5) are rotatably mounted between the limbs of said forks 45 by means of pivot pins 46. The rods 38 are surrounded by compression springs 48 which extend between the forks 45 and the upper sides of said unit.

Figure 5:
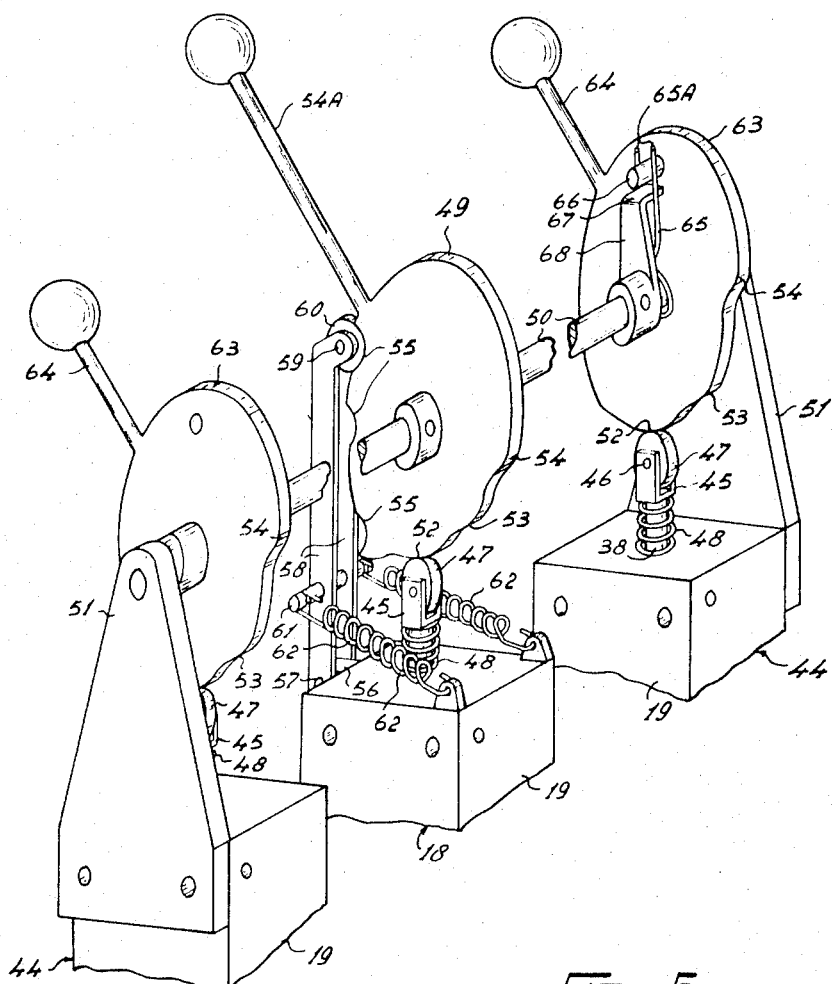
FIGURE 5 is a perspective view, to an enlarged scale, showing the adjusting members for the control mechanisms, the housings of said control mechanisms being spaced relatively far from each other for the sake of clarity.

The roller 47 associated with the control mechanism 18 is urged by its spring 48 against the periphery of a cam disc 49 that is secured to a shaft 50 rotatably mounted in a support 51 (FIGURE 5). The shaft 50 is located above the control mechanisms 18 and 44 and the supports 51 are secured to the housings of the control mechanism by means of bolts which simultaneously draw the housings 19 towards each other and into contact with each other as seen in FIGURE 4.

From FIGURE 5 it will be seen that the periphery of the disc 49 is so shaped that it has three steps or curved projections 52, 53 and 54. It will be evident that the rod 38 of the mechanism 18 will occupy three different positions relative to the housing 19 when the roller 47 comes into contact with any one of said steps 52 to 54. The disc 49 carries a lever 54A and the periphery of the disc 49 is formed with three recesses 55. The recesses 55 are adapted to receive a roller 60 rotatably mounted between two arms 58 on a pin 59. The arms 58 are pivotally connected to the housing 19 of the control mechanism 18 by means of a support 56 secured to the housing 19 and a pin 57. When the roller 60 is received in any chosen one of the recesses 55, a corresponding one of the steps 52, 53 or 54 is then in engagement with the roller 47 of the rod 38. The roller 60 is urged into engagement with the disc 49 by means of tension springs 62 which extend between the housing 19 of the control mechanism 18 and a support 61 connected to the arms 58.

The rollers 47 of the adjusting members for the pistons 20 and 21 of the adjusting mechanisms 44 cooperate with cam discs 63 which are also provided with three steps 52, 53 and 54. Each disc 63 carries a lever 64 which is located on the same side as the lever 54A of the disc 49. The discs 63 are rotatable about the shaft 50 and are coupled therewith by means of springs 65 that are attached to the shaft 50 and have their ends 65A, which cooperate with stops 66, mounted near the circumferences of the discs 63. The ends 65A are located one on each side of the corresponding stop 66. There are also arranged between said ends 65A the bent-over ends 67 of strips 68 provided on the shaft 50.

From FIGURES 1 to 4 it will be evident that each of the hydrtaulic rams 15 communicates with a gas pressure vessel 69 in addition to the pipes 16. The vessels 69 are fastened to the rams 15 (see FIGURE 2) and the hydraulic rams 39 are also associated with pressure vessels 69 which preferably contain nitrogen.

The hydraulic system includes means for maintaining a constant pressure in the hydraulic rams that cooperate with the working members of the machine which are, in this particular embodiment, the mowing table or parts thereof. The operation of the hydraulic system will now be described.

The working member comprising the mowing table is supported by the hydraulic rams 15 and is moved over the ground with its base bearing against the ground surface. In the position of the mowing table shown in FIGURE 2, the pistons 20 and 21 in the housing 19 of the control mechanism 18 occupy the position shown in FIGURE 3. As mentioned previously, the rams 15 communicate with the compartment 23, and for the position of the pistons 20 and 21 shown in FIGURE 2, communication is blocked between the rams 15 and the pump 32 and tank 28 by way of the compartments 25 and 24 respectively. The piston 20 shuts the opening to the tapping 36 and the pistons 20 and 21 are held in position shown in FIGURE 3 by virtue of the fact that the pressure in the rams 15 together with the force exerted by the spring 34 balances the pressure in the compartment 25 produced by the pump 32. When the pressure in a ram 15 varies, for example, when a portion of the mowing table encounters an obstacle, the pressure in the compartment 23 will also vary so that the pistons 20 and 21 are displaced and the opening to the tapping 36 is uncovered by the piston 20 so that liquid can flow to or from the ram 15 concerned from or to the pump 32 or tank 28 respectively.

Upward movement of the mowing table will cause the pressure in the rams 15 to decrease which hence decreases the pressure in the compartment 23 and the pistons 20 and 21 are both displaced so that the tapping 36 can communicate with the compartment 25 so that liquid can flow to the rams 15 from the pump 32 until equilibrium is reached whereupon the piston 20 again blocks the opening to the tapping 36 and the mowing table bears on the ground with the same pressure. When the mowing table encounters a hollow or depression in the ground, the liquid in the rams 15 will be compressed to a greater extent and the pressure in the compartment 23 will increase so that the pistons 20 and 21 are moved so as to communicate the tapping 36 with the compartment 24 so that liquid can flow from the rams 15 to the tank 28. The pressures in the rams 15 will then be reduced to their original values and the mowing table can bear on the ground with its initial pressure.

The gas pressure vessels 69 associated with the rams 15 assist in a smooth following of the surface of the ground by the mowing table owing to the compressibility of the gas contained in such vessels 69. The vessels 69 ensure a smooth following of the ground surface in response to relatively small unevenesses in the ground surface. The pressure which the mowing table normally exerts on the ground can be varied by means of the set bolt 36 associated with the control mechanism 18. Turning of such set bolt 35 alters the compression in the spring 34. It will be evident that, if the compression in the spring 34 is increased, then a relatively lower hydraulic pressure in the compartment 23 and rams 15 will be required in order to balance the forces exerted by the pressure of the hydraulic liquid in the compartment 25 that is in communication with the pump 32. With a lower hydraulic pressure in the rams 15, the mowing table will bear on the ground with a greater pressure and, conversely, reducing the compression in the spring 34 will cause the mowing table to bear on the ground with relatively lower pressure. The pressure prevailing in the rams 15 may be ascertained by viewing the pressure gauge 37.

The set bolt 35 associated with the control mechanism 18 used in conjunction with the pressure gauge 37 allows the pressure in the rams 15 and hence the pressure which the mowing table exerts on the ground to be set to any desired value prior to commencing operation of the combine harvester. Once chosen, this pressure will be automatically maintained. The operation of the control mechanisms 44 for the hydraulic rams 39 corresponds with the operation of the control mechanism 18 just described. The control mechanisms 44 for the rams 39 enable a satisfactory adaptation of the outside edges of the mowing table portions 4 to the ground surface. The portions 4 which each comprise a working member are pivotable relative to the frame of the combine harvester about pivotal axes afforded by the pins 8. Also the vessels 69 associated with the portions 4 afford a resiliency to the support thereof by the rams 39.

As stated previously, the rods 38 which are slidably arranged in the housing 19 of the control mechanisms 18 and 44 can be moved into three different positions by means of the cam disc 49 for the control mechanism 18 and the cam discs 63 for the control mechanisms 44. In the positions of the discs shown in FIGURE 5, the rods 38 occupy the positions shown in FIGURE 4 and the rollers 47 bear against the steps 52 on the peripheries of the discs. The disc 49 may be rotated by means of the lever 54A and the discs 63 then will also be rotated by the same amount until the rollers 47 come into contact with the steps 53. The rods 38 then abut against the pistons 20 to prevent the compartments 24 from communicating with the rams 15 and 39 respectively as would normally be the case when said pistons are moved by variations in pressure in the rams. This position of the rod 38 can be varied when in operation the mowing table is held at a distance above the ground. Out of this position in which the rollers 47 bear against the steps 53, the resilient connection of the discs 63 with the shaft 50 permits them to be moved independently of each other and the disc 49 by means of the levers 64 into positions in which their rollers 47 come into contact with the steps 54.

As a result of the movement of the discs 63 so that the rollers 47 come into contact with the steps 54, the rods 38 in the housings 19 of the control mechanisms 44 are displaced so that the pistons 20 no longer prevent a supply of liquid from the pump 32 to the rams 39. Hence the portions 4 of the mowing table can be pivoted upwardly about their pivots 8. Hence, during operation, each portion 4 can be independently pivoted, if desired, about its pivotal axis afforded by the pins 8. The rigidity of the springs 65 is such that, when a disc 63 is displaced, the disc 49 is not unlocked from the engagement of the roller 60 with the chosen recess 55. The mowing table as a whole can be raised by moving the lever 54A until the disc 49 takes up such a position that the roller 47 comes into contact with the step 54. The disc 49 is held in this position by the roller 60 and the pistons 20 and 21 are then located in a position such that liquid can flow from the pump 32 to the rams 15.

It will be evident from FIGURE 5 that the step 54 on the disc 49 is offset relative to the steps 54 on the discs 63 so that said first-mentioned step 54 comes into contact with the roller 47 of the control mechanism 18 for the rams 15 earlier than the steps 54 of the discs 63 come into contact with the rollers 47 of the control mechanisms 44. Hence the mowing table will be raised partly before the steps 54 on the discs 63 come into contact with the rollers 47 of the control mechanisms 44 thereby pivoting the portions of the mowing table inwardly about the pivots 8 by the rams 39.

Having thus described my invention, what I claim as new and desire to secure by Letters Patent of the United States is:

1. An agricultural machine having a frame and at least two crop-working members pivotably connected to said frame, adjusting means for moving said crop-working members, said adjusting means comprising first adjusting members for raising and lowering said crop-working members relative to said frame and second adjusting members for moving one of said crop-working members relative to another, a hydraulic circuit including a control mechanism for regulating the flow of hydraulic fluid to said first and said second adjusting members and to move said crop-working members, operative means in said control mechanism for permitting hydraulic fluid to flow to said first adjusting means in advance of said second adjusting means whereby said crop-working members are initially raised relative to the frame before one of said crop-working means is moved relative to another.

2. A machine as claimed in claim 1, wherein the control mechanism has separate control valves for the first and second adjusting members.

3. A machine as claimed in claim 2, wherein each crop-working member is provided with a corresponding first and second adjusting member.

4. A machine as claimed in claim 3, wherein the operative means in the control mechanism operates the control valve associated with the first adjusting members and also operates the control valves for the second adjusting members after the crop-working members have been initially raised.

5. A machine as claimed in claim 4, wherein the operative means for the control valves include a plurality of cams mounted on a common shaft.

6. A machine as claimed in claim 5, wherein a cam associated with the first adjusting members is rigidly secured to said shaft and cams associated with the second adjusting members are turnable relative to said shaft against the action of a spring.

7. A machine as claimed in claim 6, wherein the cam associated with the first adjusting members is shaped with steps which are angularly disposed with respect to said shaft in advance of corresponding steps on the other cams in the neutral position of the operating mechanism whereby the control valve for the first adjusting members is operated before the control valves for the second adjusting members.

8. A machine as claimed in claim 1, wherein the machine is a combine harvester and the crop-working members comprise a mowing platform.

9. A machine as claimed in claim 8, wherein the control mechanism is located near the driver's seat on the combine harvester.

10. A machine as claimed in claim 8, wherein the mowing platform comprises two portions which are pivotable relative to each other by means of said adjusting members about axes that lie in planes extending parallel to the intended direction of operative travel of the machine.

11. A machine as claimed in claim 10, wherein each portion comprises its own cutting mechanism.

References Cited

UNITED STATES PATENTS

| | | | |
|---|---|---|---|
| 2,913,878 | 11/1959 | Rue | 56—20 X |
| 3,019,029 | 1/1962 | Sampietro | 267—64 X |
| 3,088,264 | 5/1963 | Sallee | 56—210 |

ABRAHAM G. STONE, *Primary Examiner.*

P. A. RAZZANO, *Assistant Examiner.*